Figure 1:
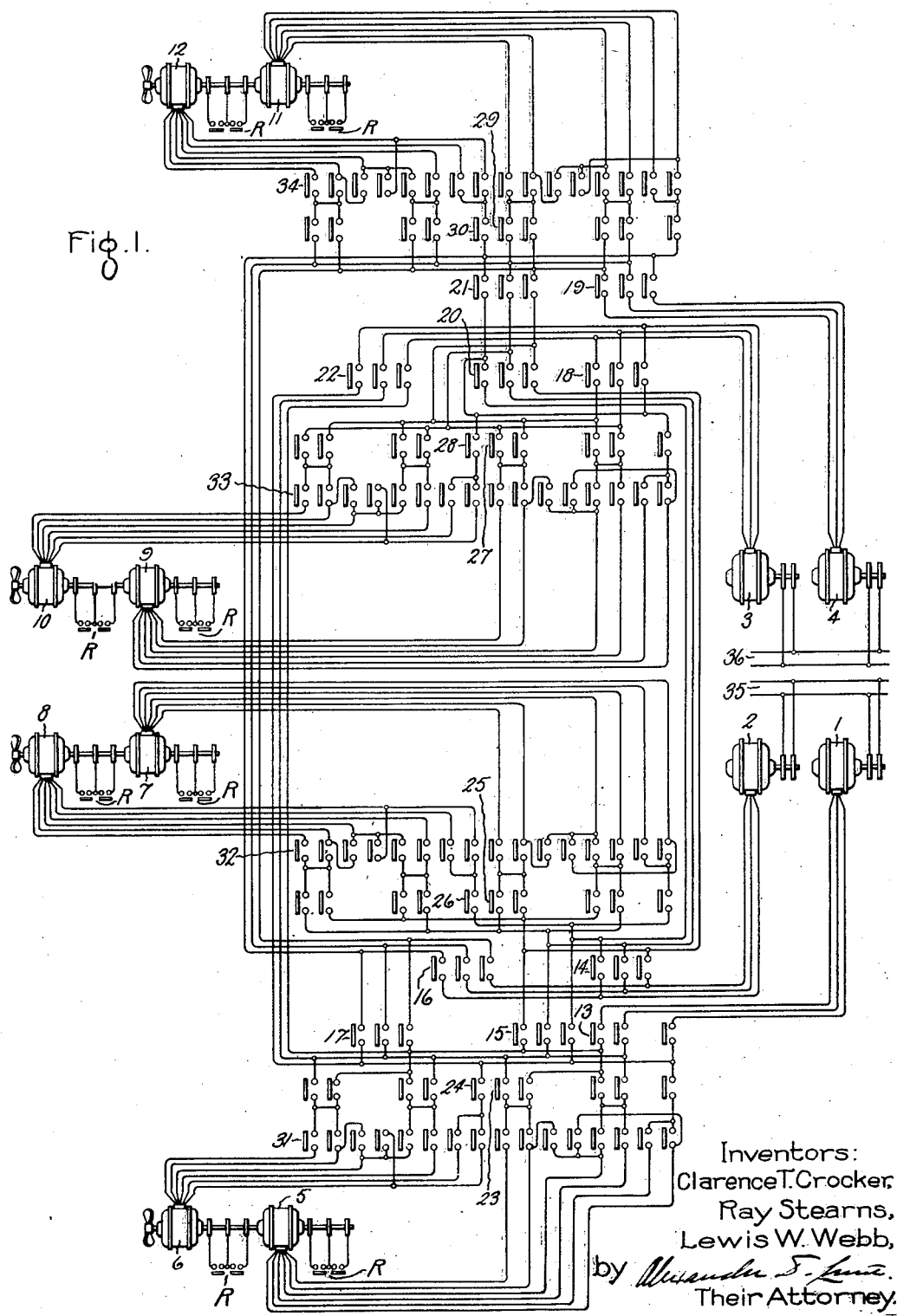

May 4, 1926. 1,583,578
C. T. CROCKER ET AL
POWER SYSTEM
Filed Oct. 18, 1923   6 Sheets-Sheet 1

Inventors:
Clarence T. Crocker,
Ray Stearns,
Lewis W. Webb,
by Alexander F. Lunz.
Their Attorney.

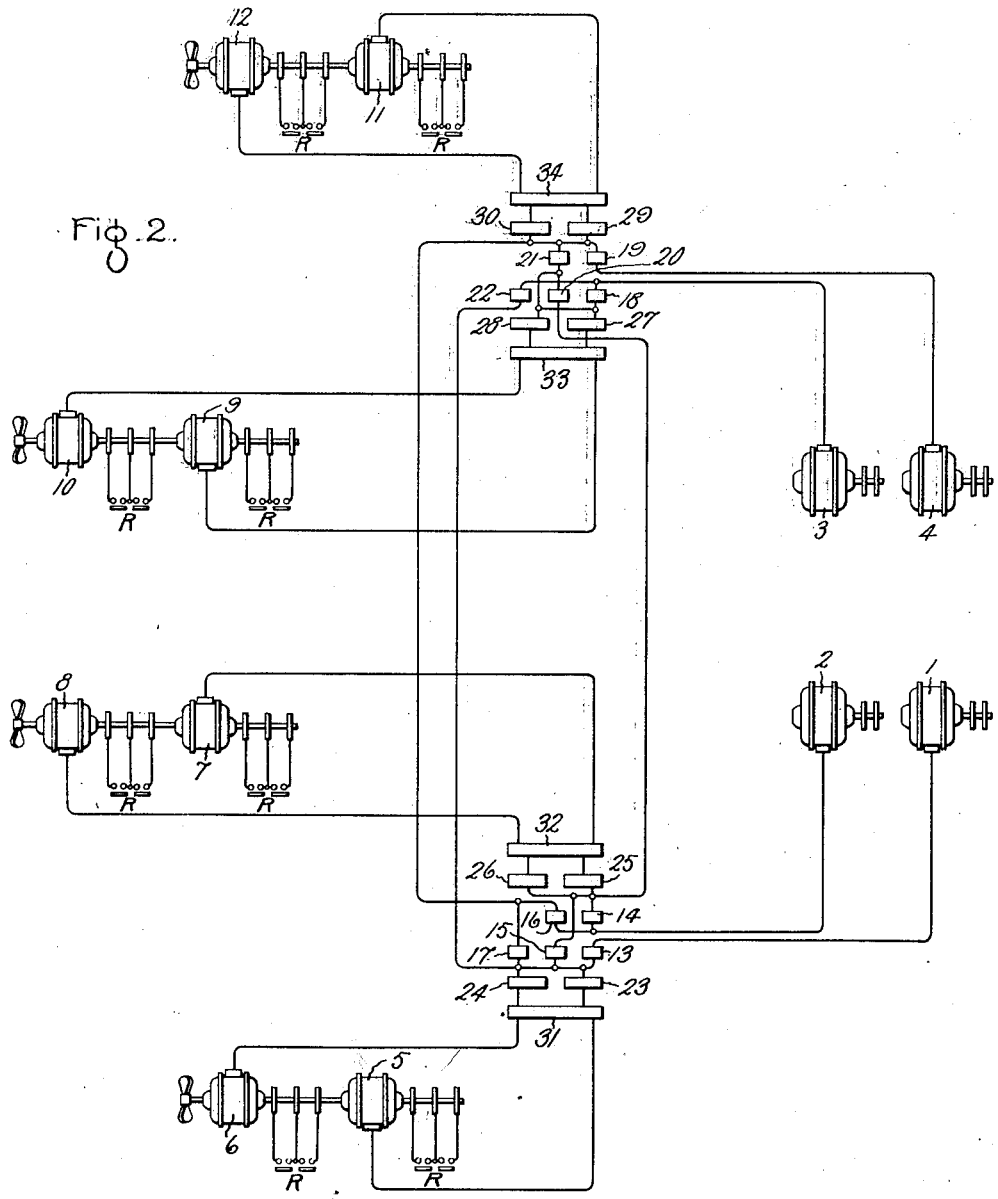

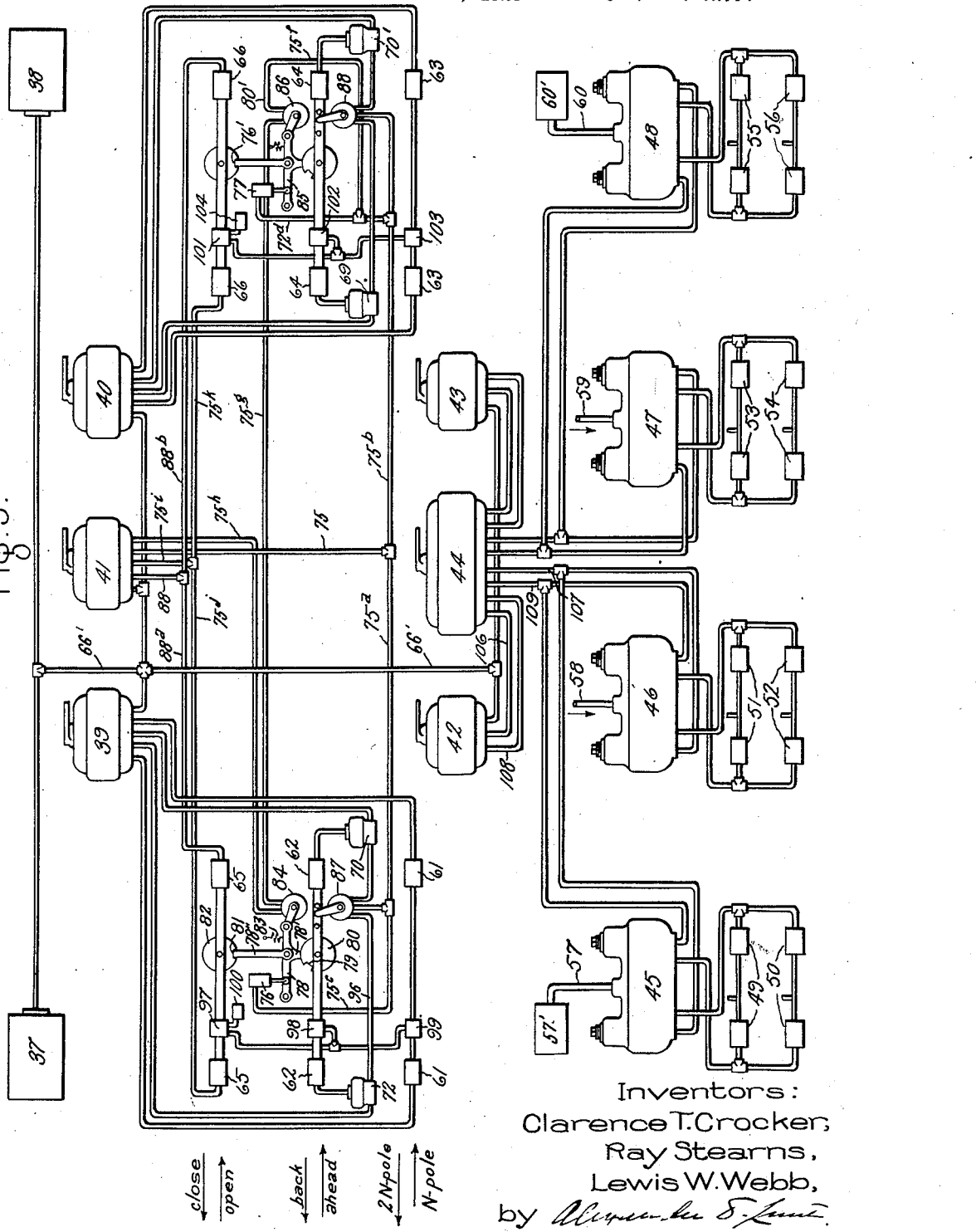

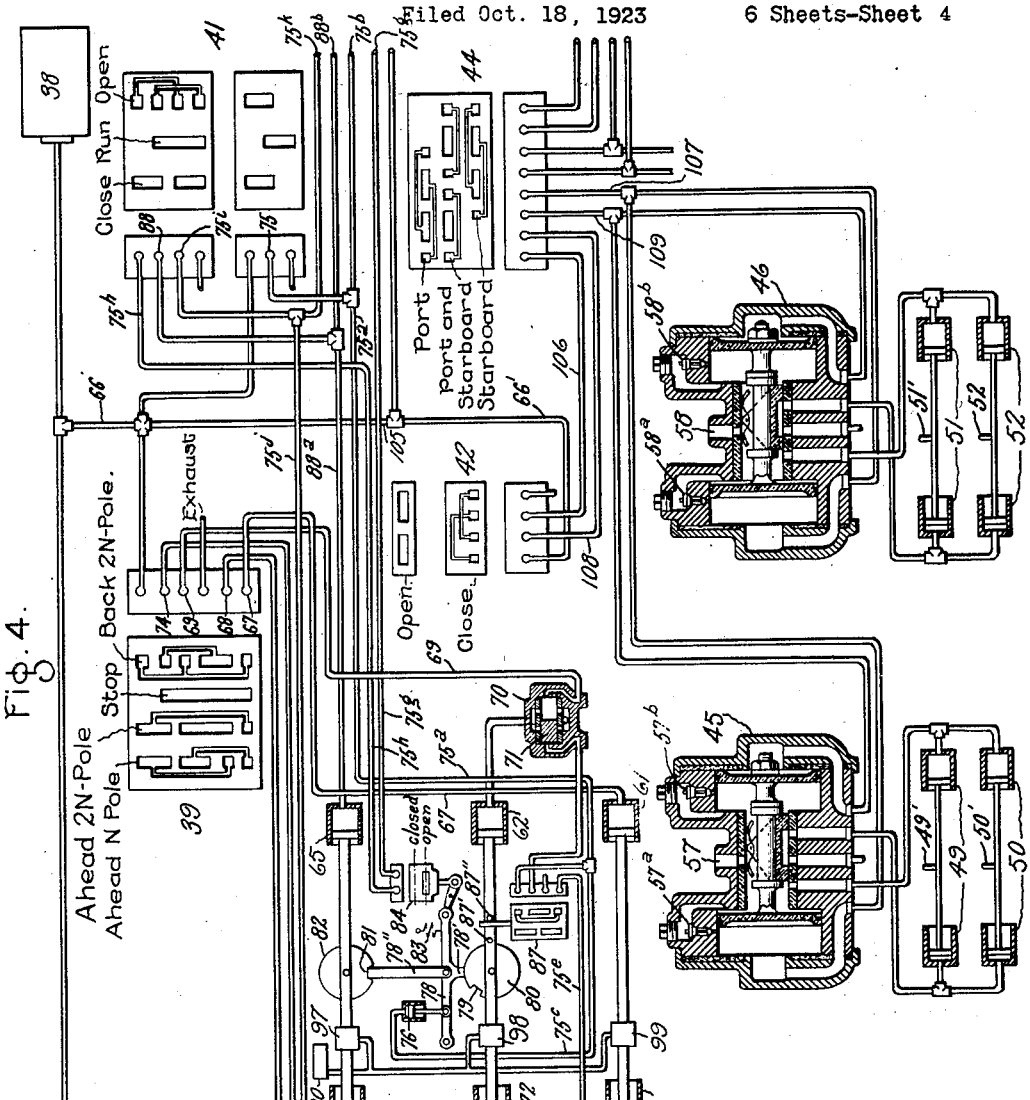

May 4, 1926.
C. T. CROCKER ET AL
POWER SYSTEM
Filed Oct. 18, 1923
1,583,578
6 Sheets-Sheet 5
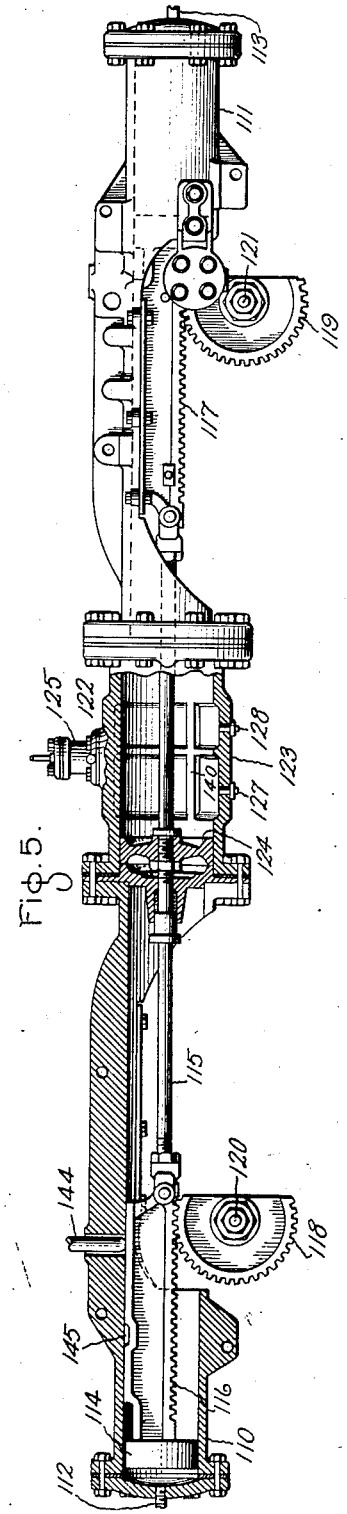
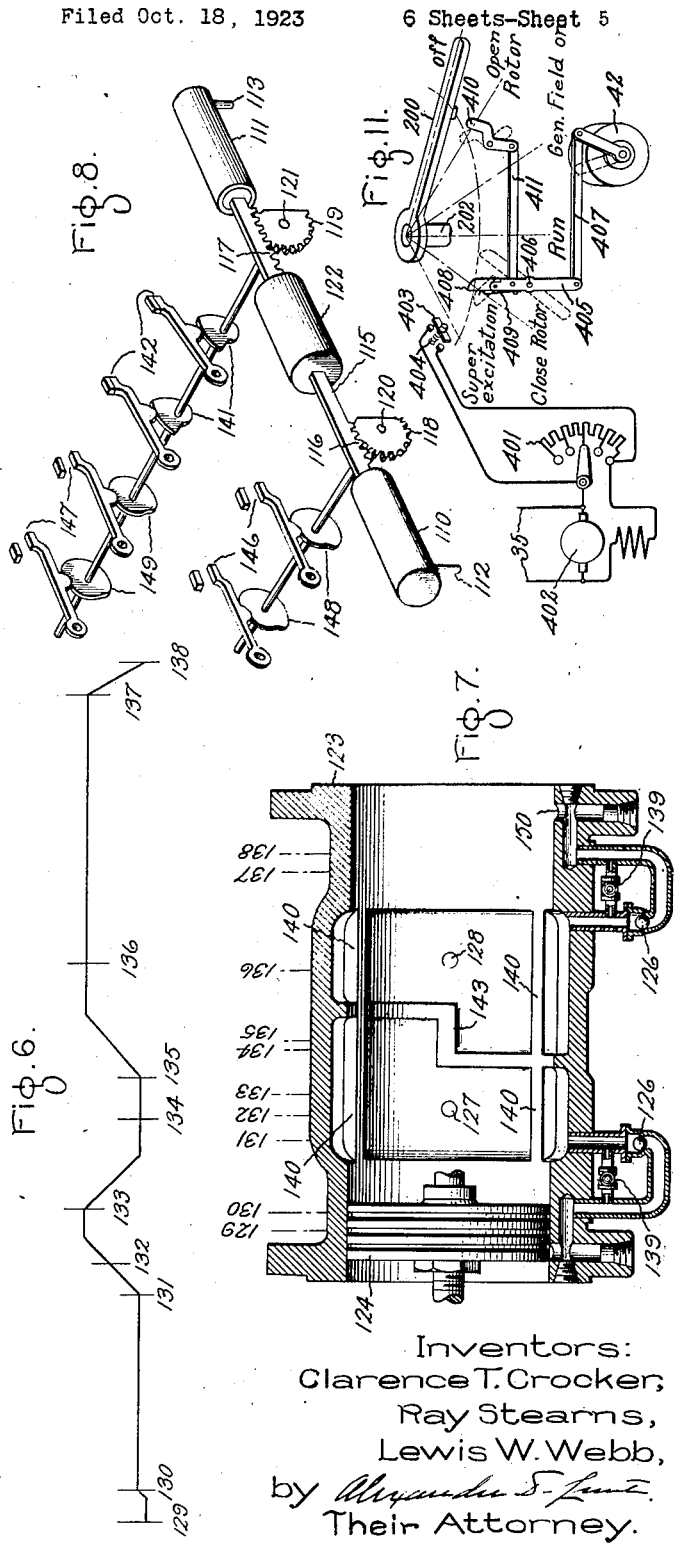
Inventors:
Clarence T. Crocker,
Ray Stearns,
Lewis W. Webb,
by Alexander S. Lunt
Their Attorney.

May 4, 1926.

C. T. CROCKER ET AL

POWER SYSTEM

Filed Oct. 18, 1923

1,583,578

6 Sheets-Sheet 6

Inventors:
Clarence T. Crocker,
Ray Stearns
Lewis W. Webb,
by Alexander S. Lane
Their Attorney.

Patented May 4, 1926.

1,583,578

UNITED STATES PATENT OFFICE.

CLARENCE T. CROCKER, RAY STEARNS, AND LEWIS W. WEBB, OF SCHENECTADY, NEW YORK, ASSIGNORS TO GENERAL ELECTRIC COMPANY, A CORPORATION OF NEW YORK.

POWER SYSTEM.

Application filed October 18, 1923. Serial No. 669,408.

*To all whom it may concern:*

Be it known that we, CLARENCE T. CROCKER, RAY STEARNS, and LEWIS W. WEBB, citizens of the United States, residing at Schenectady, in the county of Schenectady, State of New York, have invented certain new and useful Improvements in Power Systems, of which the following is a specification.

Our invention relates to power systems and especially to systems of electric ship propulsion wherein a plurality of electric generators and motors are arranged to be connected with each other in various ways by means of switches and wherein the combination of switches operated is predetermined by a selector mechanism arranged to control the connection between the switches and the means by which they are operated.

The number of different generator and motor combinations necessary to give the required degree of flexibility in a given power system is largely determined by the character of the work to be done and the conditions under which the system is operated. In order to secure even a limited number of combinations there is required a degree of flexibility in control that involves a wide range of coordination between the various elements involved in the operation of the system. Thus in a system of electric ship propulsion, for example, the generators which supply power to the propeller motors are usually designed to operate most efficiently when all of them are utilized to drive the vessel at full speed. At cruising speeds, however, the power required to drive the ship is reduced in proportion to the cube of the ship's speed and operation at these lower speeds necessarily involves either a reduction in generator efficiency or the operation of a smaller number of generators. It is therefore desirable to adjust the number of generators operated in accordance with the speed at which the ship is driven. Since it is best to operate all the propellers at all speeds of the ship, a reduction in the number of generators necessarily involves rearrangement in the combinations of motors and generators, and it is highly desirable that means for connecting them in all possible combinations be provided not only for the purpose of securing the highest operating efficiency of the generators but also to permit inspection and repairs of the apparatus when required.

An object of our invention is to provide a power system having control means arranged to interconnect the various generator and motor units, which it comprises, in a plurality of different combinations each suited efficiently to perform the work required to be done under one operating condition of the system. A further object is to provide a system of electric ship propulsion having the operation of its switches controlled by selector means arranged to predetermine the particular switches operated in response to actuation of the switch operating means. A further object is to provide a selector mechanism which is simple and reliable in its operation. A further object is to provide an effective and reliable arrangement of fluid pressure means for operating the switches arranged to interconnect the various generator and motor units in a system of the class described.

Our invention will be better understood on reference to the following description when considered in connection with the accompanying drawing and its scope will be pointed out by the appended claims.

Figures 9, 10:
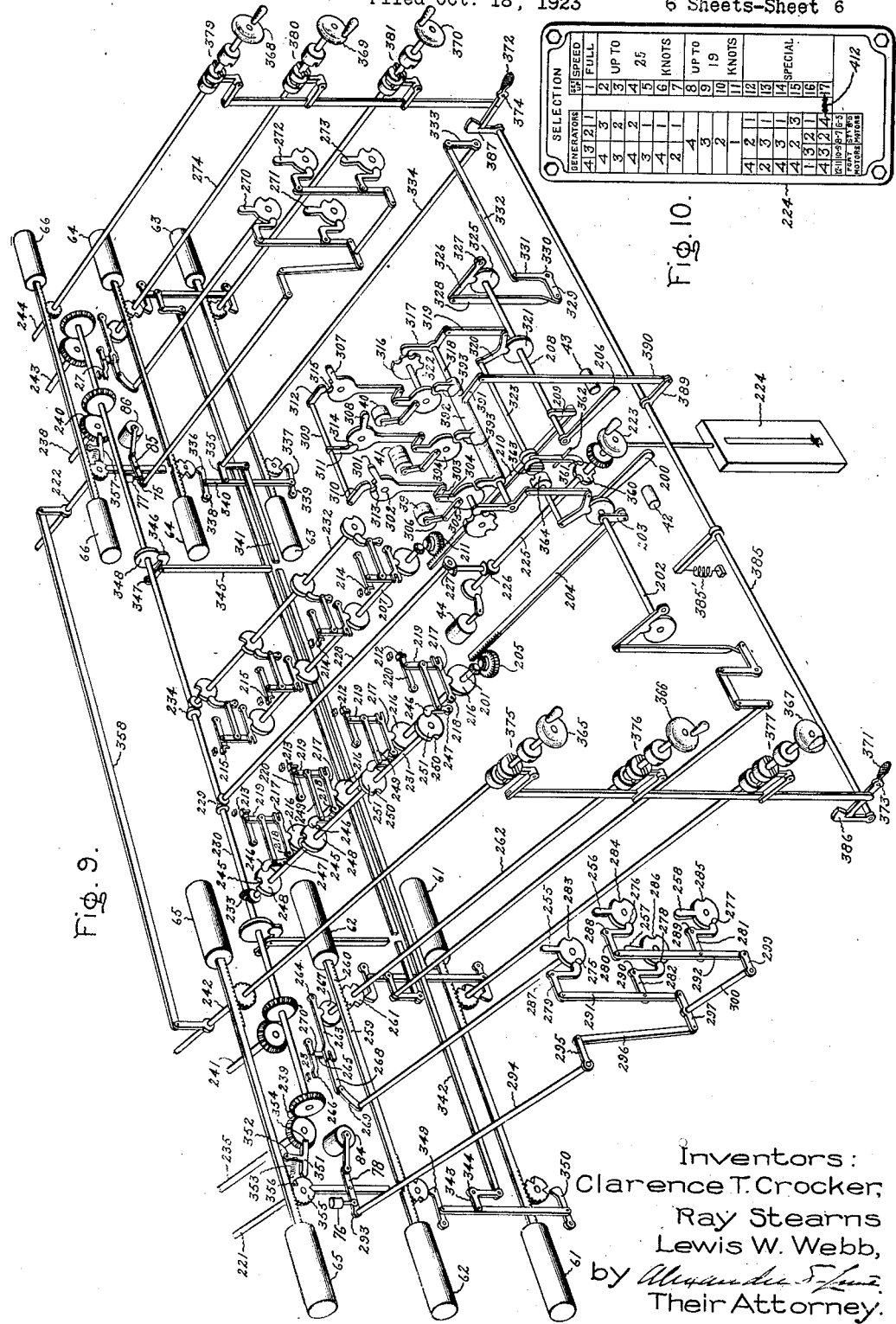

Referring now to the drawing: Fig. 1 shows a system of ship propulsion in connection with which our invention is adapted to be utilized; Fig. 2 is a simplified diagram of the system shown in Fig. 1; Fig. 3 shows fluid pressure control means for controlling the operation of the switches shown diagrammatically in Figs. 1 and 2; Fig. 4 shows in greater detail the switch control means shown in Fig. 3; Figs. 5 to 8 inclusive relate to a fluid pressure engine suitable for operating the switches shown diagrammatically in Figs. 1 and 2, Fig. 9 shows the interlocked arrangement of control mechanism and certain parts of the selector mechanism by which the operation of the system is predetermined; Fig. 10 is a chart showing the different combinations effected through the operation of the selector mechanism; Fig. 11 shows certain details of the control mechanism, and Fig. 12 indicates the various positions of the levers by which operation of the ship is controlled.

Figs. 1 and 2 show a system of ship propulsion comprising a plurality of turbo generators 1, 2, 3 and 4 arranged to supply current to a plurality of propeller motors 5 to 12 inclusive through generator switches 13 to 22 inclusive, reversing switches 23 to 30 inclusive and pole changing switches 31 to 34 inclusive. For purposes of illustration each of the propeller motors has been shown as provided with switches R for altering the connections of its secondary circuit. It is obvious, however, that these switches may be replaced by adjustable resistors or with switches arranged to alter the secondary connections in any other desired manner. Suitable sources of direct current 35 and 36 interconnected with one or more exciting machines, as indicated in Fig. 11, are provided for supplying excitation to the generators 1, 2, 3 and 4. The ten generator switches, 13 to 22 inclusive, may be manipulated to give seventeen different aggroupments of the generators and motors as indicated by the chart shown in Fig. 10 which also shows the range of ship speeds produced by certain of the combinations.

Figs. 3 and 4 show the controller valves and associated apparatus through which operation of the generator switches, the reversing switches, the pole changing switches, and the rotor switches or other means for controlling the secondary circuits of the propeller motors, is effected. From suitable sources of fluid pressure 37 and 38, operating fluid, for example air, is supplied to the starboard pole changing and reversing controller 40, the generator controller 41, port rotor controller 42 and starboard rotor contoller 43. The controller 44 is supplied with operating fluid through the controllers 42 and 43 and is provided for the purpose of permitting control of all the rotor secondary circuits through either controller 42 or 43 when the ship is operated from the generators on one side of the ship. Each of the rotor valves, 45 to 48 inclusive, is arranged to control the supply of operating fluid to two rotor switch operating engines which control the secondary circuits of motors mounted on the same propeller shaft. These engines are indicated by the numerals 49 to 56 inclusive and each pair of engines receives its operating fluid through the corresponding rotor valve from one of the inlet pipes 57 to 60 inclusive. The rotor switch engines are located near the motors and at a great distance from the control board. Local tanks, 57' and 60' only being shown, furnish pressure to operate the rotor engines and these tanks are kept charged through the valves 45 to 48 as hereinafter described. In case of injury to the fluid pressure mechanism the rotor switch engines may be operated manually by suitable means indicated diagrammatically at 49', 50', 51', 52'.

The controller 39 is arranged to control the supply of operating fluid to the port pole changing engine 61 by which operation of the pole changing switches 31 and 32 (see Fig. 2) is effected and also to control operation of the port reversing engine 62 which is arranged to operate the port reversing switches 23, 24, 25 and 26 which may be regarded as double throw switches since they have two operative positions. As far as the broader aspects of our invention are concerned, any suitable mechanism may be interposed between the engines and switches which they operate for the purpose of transmitting motion therebetween. Preferably the switches are operated by cams mounted on shafts which are rocked back and forth or rotated by movement of the engine piston rods as hereinafter described.

The controller 40 is similarly arranged to control the supply of operating fluid to the starboard pole changing engine 63 provided to operate the starboard pole changing switches 33 and 34, and to the starboard reversing engine 64 through which the starboard reversing switches 27, 28, 29 and 30 are operated.

The controller 41 is arranged to control the generator switch engines 65 and 66. Engine 65 is provided for operating the generator switches 13 to 17 (see Fig. 2) and engine 66 is provided for operating the generator switches 18 to 22. The arrangement is such that the generator switch engines 65 and 66 can be operated only when the reversing engines, both port and starboard, are in midposition at which time the reversing switches are open. The controller 41 is therefore arranged to move both reversing engines 62 and 64 to midposition and lock them in such position before operating the generator switch engines.

From the general description of the controllers 39, 40 and 41 just given, it will be seen that the controllers 39 and 40 are provided for operating the pole changing and reversing engines on the port and starboard sides of the ship respectively, while the controller 41 is provided for operating the generator switch engines on both sides of the ship and for also moving the reversing engines on both sides of the ship to midposition as a preliminary to operating the generator switch engines. Each reversing engine may therefore be regarded as operable from either of two sources, namely from the corresponding controller 39 or 40, or from the generator controller 41.

The controller 41 has three positions: "run", "close" and "open". The controllers 39 and 40 each have four positions: "stop", "back 2N-pole", "ahead 2N-pole", and "ahead N-pole". Certain interlocks hereinafter described are provided whereby controllers 39 and 40 can only be moved when controller 41 is in the "run" position, and controller 41 can only be moved when controllers 39 and 40 are in the "stop" position. The control of the circuits between the generators and motors for maneuvering the ship is accomplished by the controllers 39 and 40 which are operated by certain control levers hereinafter described, the controller 41 being left in "run" position. The controller 41 needs to be operated only when it is desired to make a change in the number of generators or motors in operation.

It will facilitate an understanding of the operation of the whole system, if mention is here made of the fact that the switch operating engines for the generator, reversing and pole changing switches, operate these switches through elements of a selector mechanism hereinafter described. At this point in the description it need merely be stated that this selector mechanism is operated to establish an operative connection between the engines and the switches to be closed thereby, so that when the engines operate, they close the selected switches only, the other switches being left open because the mechanical connection between the engines and such switches is disestablished by the selector mechanism. The selector mechanism thus makes it possible for the operator to execute the various maneuvering operations by manipulating a few simple control levers which are manipulated in exactly the same way whether all or a part only of the generators and motors are in use.

As heretofore stated, the controllers 39 and 40 operate in the same way. A description of the operation of controller 39 only will therefore be sufficient. The four positions of this controller are indicated in Fig. 4. In the "back 2N-pole" position, operating fluid is admitted from the supply pipe 66' through the pipe 67 to the right hand cylinder of the pole changing engine 61, thus moving it to its 2N-pole position which is the position illustrated. The left-hand cylinder of the engine 61 is connected by the pipe 68 to the exhaust port of the controller. Operating fluid is also admitted through the pipe 69 and valve 70 (the piston 71 of which is in its left-hand position) to the right hand cylinder of the reversing engine 62, thus moving it to its "back" position, which is the position illustrated. The left-hand cylinder of the engine 62 is connected through the valve 72 (the piston 73 of which is in its right-hand position) through the pipe 74 to the exhaust port of the controller. If the controller 39 is moved to "stop" position, connection to the supply pipe 66' is cut off and pipes 67, 68, 69 and 74 are connected to the exhaust port of the controller. If the controller is moved to the "ahead 2N-pole" position, pressure is applied to the pole changing engine 61, in the same direction as before so that this engine does not move but remains in its "2N-pole" position. The reversing engine is now, however, moved to its "ahead" position, since pressure is supplied through the pipe 74, pipe 69 being connected to the exhaust. If the controller 39 is moved from the "ahead 2N-pole" position to the "ahead N-pole" position, the pole changing engine 70 is moved to its right-hand or "N-pole" position, but the reversing switch remains in its right-hand or "ahead" position.

The valves 70 and 72 are provided for the purpose of enabling operation of the reversing engine 62 either from the controller 39, as just described, or from the controller 41. It will be remembered that the controller 41 for operating the generator switch engines 65 and 66 is arranged to move the reversing engines 62 and 64 to midposition and lock them there before the generator switch engines can move.

The operation of the controller 41 will now be described. As heretofore stated, the controllers 39 and 40 must be moved to "stop" position before controller 41 can be moved.

When controller 41 is moved to the "open" position, pressure is admitted from the pipe 66' through the pipe 75 to the pipes 75$^a$ and 75$^b$. The pipes 75$^a$ and 75$^b$ are connected respectively through pipes 75$^c$ and 72$^d$ to the cylinders 76 and 77 of a fluid pressure operated interlocking mechanism. This interlock mechanism for the port engines 62 and 65, comprises a lever 78 having a lower projection 78' cooperating with a slot 79 in a disk 80 turned by the reversing engine 62, and an upper projection 78'' cooperating with a slot 81 in a disk 82 turned by the generator switch engine 65. A spring 83 tends to hold the lever 78 in its upper position. The lever 78 is also arranged to control a valve 84, this valve being closed when lever 78 is in its upper position and open when the lever is in its lower position. The fluid pressure interlock mechanism for the starboard engines 64 and 66 is the same and comprises a lever 85 controlling a valve 86.

It will be observed that the valves 84 and 86 are both closed only when both reversing engines 62 and 64 are locked in midposition. The application of pressure to the pipe 75 as above described applies force tending to move the levers 78 and 85 toward the down position, but it is apparent that neither lever can so move until the corresponding reversing engine has first moved to midposition.

A description will now be given of how the controller 41 causes the reversing engines 62 and 64 to move to midposition, and a description will then be given of how the closing of valves 84 and 86 control the operation of the generator switch engines 65 and 66.

The reversing engine 62 is provided with a valve 87 for operation from the controller 41. The valve 87 is operated by a loose connection between the piston rod of the engine and the valve. As shown in Fig. 4, the piston rod is provided with a pair of lugs 87' and 87'' which move the valve 87. The arrangement is such that when the engine practically completes its movement in one direction, the valve is thrown to connect the engine for movement in the reverse direction, which position the valve maintains until movement in the reverse direction is practically completed. A pipe leading to valve 87 is connected to pipe 75$^a$. The pressure which is applied to the pipes 75 and 75$^a$ with the controller 41 in the "open" position, causes fluid to flow through the valve 87, pipe 75$^e$, valve 72 (the piston 73 of which moves to the left), to the left-hand cylinder of the engine 62. The engine 62 therefore starts to move toward the right and when it reaches midposition the projection 78' on the lever 78, which is being forced downwardly by the pressure in cylinder 76, engages the slot 79 in the disc 80 and locks the engine against further movement. The starboard reserving engine is provided with a valve 88 operating in exactly the same way that the valve 87 of the port reversing engine operates.

When both the port and starboard reversing engines have been locked in midposition, the valves 84 and 86 are open. Operating fluid will now flow through pipes 75, 75$^b$, 75$^f$ (see Fig. 3) valve 86, pipe 75$^g$, valve 84, pipe 75$^h$ (see Fig. 4) through the controller 41, pipe 75$^i$, to pipes 75$^j$ and 75$^k$. The pipe 75$^j$ leads to the left-hand cylinder of engine 65, which will move to its "open" position, the right-hand cylinder being connected to exhaust through pipes 88 and 88$^a$. The pipe 75$^k$ leads to the left-hand cylinder of engine 66, which will also move to its open position, the right-hand cylinder being connected to exhaust through pipes 88 and 88$^b$. The generator switches are now open and the reversing switches are also locked in mid or open position.

The function of the valves 84 and 86 is to ensure that the reversing switches on both the port and starboard sides shall be in the mid or open position before the generator switches can be moved. This is necessary for the reason that all of the motors in operation may be supplied by a generator or generators on but one side of the ship.

The generator switch engines being in switch open position and the reversing switch engines in mid or switch open position, assume that the controller 41 is thrown to "close" position. Pressure is again applied to the pipes 75, 75$^a$, 75$^c$, 75$^b$ and 75$^d$ as before, and the fluid pressure interlock is effective to hold the reversing engines in midposition. The valves 84 and 86 are still closed and pressure is applied through the pipes 75, 75$^b$, 75$^f$, valve 86, pipe 75$^g$, valve 84, pipe 75$^h$, through the controller 41, in this case to the pipes 88, 88$^a$, and 88$^b$, to operate the generator switch engines to their left-hand or switch closed position. The pipes 75$^i$, 75$^j$ and 75$^k$ in this case are connected to the exhaust port of the controller. The generator switches are now in closed position, and if the controller 41 is moved to "run" position, pipes 75, 75$^i$, and 88 are connected to exhaust, and the connections to pipes 66' and 75$^h$ are closed. The connection of pipe 75 to exhaust relieves the pressure on the fluid pressure interlock and the levers 78 and 85 are moved to the upper position by their springs, thus locking the generator switch engine in switch closing position and releasing the reversing switch engines. By manipulation of the controllers 39 and 40 the reversing and pole changing engines may now be operated as heretofore described.

From the preceding description of the operation of the valves 70 and 72 for the reversing engine 62 it will be seen that these valves are selector valves in the sense that they select the proper admission and exhaust ports to enable the engine to be operated either from the controller 39 through pipes 69 and 74 or from the controller 41 through pipes 75 and 75$^a$. The valve 87 at the same time it completes a connection through valve 72 for admitting pressure from pipes 75 and 75$^a$, also completes an exhaust connection through valve 70 to an exhaust port on the valve 87 and vice versa. The pistons 71 and 73, respectively, of the valves 70 and 72 therefore always occupy a position to provide the necessary admission and exhaust ports whether the control is effected through controller 39 or controller 41. The corresponding valves provided on the starboard reversing engine 64 operate in the same manner.

In order to retard the operation of the reversing engines to facilitate locking it in mid-position and to retard the operation of all the switch operating engines at the ends of the stroke, fluid operated timers are provided. The timers for the port switch engines are shown at 97, 98 and 99 and are supplied with operating fluid from a tank 100. Like timers 101, 102, and 103, supplied from a tank 104, are provided for controlling the operation of the starboard switch engines. These timers are more fully described hereinafter in connection with Figs. 5, 6, 7 and 8.

Operating fluid is supplied to the rotor switch valves 45, 46, 47 and 48 from the reservoirs 37 and 38 through pipe 66', rotor controllers 42 and 43 and the controller 44. Upon movement of the controller 42 to its "close" position (see Fig. 4) operating fluid is conveyed through pipe 66' to the valve 42 and thence through pipe 106 to the controller 44. Assuming the controller 44 to be in the "port and starboard" position, operating fluid is conveyed therethrough to pipe 107 from whence it is conducted to the left ends of the valves 45 and 46. The valves 45 and 46 are thereupon moved to right-hand position in which position operating fluid is supplied through inlets 57 and 58 and valves 45 and 46 to the right-hand cylinders of rotor engines 49, 50, 51 and 52 respectively. By this movement of the rotor engines the rotor connections are modified in a manner hereinafter explained. Upon movement of the controller 42 to the "open" position, operating fluid is admitted through pipe 66', valve 42, pipe 108, valve 44, (in its "port and starboard" position) and pipe 109 to the right-hand end of the rotor valves 45 and 46 which are thereupon actuated to left-hand position thereby admitting operating fluid through inlets 57 and 58 to the left-hand cylinders of the rotor engines 49, 50, 51 and 52. Under these conditions the rotor engines are moved to the right and rotor switches are manipulated accordingly. The rotor engines on the starboard side of the ship are controlled through controller 43 in like manner and a detailed description of their operation will therefore be unnecessary.

The rotor valves 45 to 48 inclusive are connected with fluid pressure storage tanks 57' to 60' inclusive through inlets 57 to 60 inclusive. The tanks 57' to 60' are provided for supplying operating fluid to the rotor engines in response to movement of the rotor valves and are kept charged with liquid under pressure through valved openings 57ª, 58ª, etc. at the left-hand end of the rotor valves when the valves are in the illustrated position and through similar openings 57ᵇ, 58ᵇ, etc. at the right-hand end of the rotor valves when the valves are in their left-hand position. These fluid storage tanks are provided for the purpose of ensuring a quick and certain operation of the rotor engines. As heretofore stated, the rotor engines are located adjacent the motors which are at a considerable distance from the control station on the ship. If it were attempted to operate the rotor engines by fluid pressure transmitted from the control station, the operation would be uncertain because of the drop in pressure due to the length of the fluid transmitting pipes.

In its "port and starboard" position the controller 44 is arranged to permit control of the port motors through the controller 42 and control of the starboard motors through controller 43 as just set forth. In its "port" position the controller 44 is arranged to permit control of both the port and starboard motors through the port controller 42, and in its "starboard" position the controller 44 is arranged to permit control of both the port and starboard motors through the starboard controller 43. The valve 44 is operated in response to manipulation of a selector mechanism, the operation of which is hereinafter explained. When this selector mechanism is moved to a position to render all the switches which connect the port generators to the system, for example, unresponsive to movement of the port generator switch engine, the valve 44 is moved to its "starboard" position which permits control of all the rotor switch engines through the valve 43. Likewise, when the selector mechanism is moved to a position to render all the switches which connect the starboard generators to the system unresponsive to movement of the starboard generator switch engine the valve 44 is moved to its "port" position which permits control of all the rotor switch engines through the controller 42.

Fig. 5 shows a fluid pressure engine suitable for operating the reversing switches. This engine is described and claimed in a copending application of Clarence T. Crocker, Serial No. 649,362, filed July 3, 1923, assigned to the assignee of the present application. Engines, exactly the same except for the timer, are used for operating the generator, pole changing and rotor switches, as indicated by Fig. 8 and, as will more clearly appear upon consideration of Fig. 9, these switches are operated by means of cams mounted on shafts geared to the engine piston rods and rotated or rocked to and fro by movement of these rods. This engine is provided at opposite ends with cylinders 110 and 111 to which operating fluid may be admitted through inlet pipes 112 and 113. A piston 114 is arranged to cooperate with cylinder 110 and through piston rod 115 is mechanically connected to a like piston adapted to move to and fro in the cylinder 111. Racks 116 and 117 mounted on the piston rod 115 are arranged to mesh with pinions 118 and 119 mounted on the cam shafts 120 and 121, respectively through movement of which opening and closing of the switches is effected.

For controlling the speed of the piston rod 115, a timer 122 comprising a cylinder 123 and a piston 124 fixed to the rod 115, is provided. This timer is provided with a suitable valve 125 through which a supply of oil or other suitable fluid is maintained within the cylinder 123, and is further provided with check valves 126 (see Fig. 7) for producing a dash-pot effect at the beginning of piston travel in either direction and for permitting egress of the operating fluid from the back of the piston near the end of its stroke. Suitable taps 127 and 128 are provided for draining the cylinder 123. The bore of the cylinder 123 is not uniform but is varied at different points of the piston travel for the purpose of controlling the engine speed in a manner which will appear upon consideration of Figures 6 and 7.

In Fig. 7, points or positions in the piston travel are indicated by numerals 129 to 138 inclusive and in Fig. 6 the relative speeds at these different positions are roughly indicated. For purposes of explanation it will be assumed that the piston 124 is just starting to move to the right. Between the points 129 and 130 the piston 124 moves at a comparatively slow speed due to the low rate at which fluid leaks past the piston surfaces. Between points 130 and 131 the speed of the piston is determined by both piston leakage and adjustment of the valve 139 which is arranged to bypass the check valve 126. The speed of the piston during this part of the stroke may be regulated by adjusting the setting of the valves 139. Between the points 131 and 133 the piston speed is greatly increased due to the fact that the piston 124 is riding on the ribs 140 thereby readily permitting the fluid readily to move past it. With the apparatus arranged as shown in Fig. 8, the switch operating cams 141 may be arranged to separate the contacts 142 during this period of the movement, as for example, at point 132. Between the points 133 and 135 the piston speed is reduced due to a projection 143 on the inner periphery of the cylinder 123 which impedes the flow of fluid past the piston 124. This projection may consist of a rib extending around the inner periphery of the cylinder 123 in a plane at an angle a few degrees less than perpendicular to the longitudinal axis or may be of any other suitable form, but, in order to facilitate construction, is preferably made in the form of two off-set semicircular fins or ribs interconnected at opposite sides of the cylinder by a horizontal rib portion. It is provided for the purpose of slowing down the movement of the piston at the center of its travel to permit locking the switches in open position as by means of a bar 144 and slot 145 in piston rod 115. Numeral 134 indicates the midposition of the piston and is the point at which the bar 144 will be caused to move into the slot 145 if it is desired to lock the engine in a position to maintain the switches open. This bar, which corresponds to the projection 78' on the lever 78 of Fig. 4, may be actuated in any suitable manner, as for example, by the fluid operated interlock heretofore described. Between points 135 and 137 the piston speed increases to and is maintained at a comparatively high value due to the fact that the piston has passed the projection 143 thereby permitting free movement of the fluid past it. During this period of the piston travel, as at point 136, for example, the contacts 146 and 147 may be closed by cams 148 and 149 respectively. Between the points 137 and 138 the piston is quickly decelerated due to the cushioning effect which results from closure of the outlet 150 by the piston 124 as it approaches the end of its travel, thus preventing escape of the fluid back of the piston through the check valve 126. The travel of the piston in the reverse direction is regulated in a manner similar to that just described. In either direction of travel the switching operations are performed while operating at a comparatively high rate of speed and there is also provided a time interval between these operations which may be utilized to lock the engine in a position to maintain the switches open.

Since the reversing switch engines are the only ones which are ever locked in midposition, the timer arrangement for slowing down the speed at the middle of the stroke is unnecessary in connection with the generator switch engines 65 and 66, the pole changing engines 61 and 63, and the rotor switch engines 49 to 56. The intermediate rib 143 for producing the slow motion at the middle of the stroke is therefore used only in connection with the reversing switch engines.

The various control levers heretofore described which control the operation of the switch engines are controlled from a common point on the ship. Fig. 9 shows the general arrangement of control levers with their various interlocks and also the selector mechanism by which the generators and motors to be operated are chosen. In addition to the control levers for controlling the circuits between the generators and motors a pair of field levers are provided for controlling the excitation circuits of the generators. The levers for operating the controllers 39, 40 and 41 and the field levers are interlocked so that the main switches can never be manipulated when the generators are excited and so that the field circuits cannot be closed when the main switches are in an improper position. A field lever 200 is mechanically connected with the port generator field switch operating shaft 201 through shaft 202, lever 203, rod 204 and gears 205. In like manner the field lever 206 is mechanically connected to the starboard generator field switch operating shaft 207 through shaft 208, lever 209, rod 210 and gears 211. In the illustrated up position of the port and starboard field levers 200 and 206, the port and starboard generator field switches 212, 213, 214 and 215 are open as will appear upon reference to the drawing. Upon movement of the field lever 200 in a downwardly direction, the generator field switches 212 and 213 are closed due to rotation of the cam operating shaft 201 which operates through cams 216 to raise the levers 217 pivoted at points 218 and thereby to force the switch contacts together, the links 219 being arranged mechanically to interconnect the levers 217 and the movable contact members 220 of the switches. Since the structure of all the generator field switches is the same their operation will be apparent without further description.

As has been previously indicated, the main switches of the port generators are operated by means of the engine 65 and those of the starboard generators are operated by means of the engine 66. The cams by which the main port generator switches are operated are mounted on the shaft 221 and since they are substantially the same as cams 216 on the shaft 201, they have been omitted for the purpose of simplifying the drawing. The cams for operating the starboard main generator switches are mounted on the shaft 222 and have been omitted for the same reason.

For controlling the mechanical connections of the main and field switches of the generators to their various operating means a selector mechanism controlled through rotation of the hand wheel 223 is provided. This hand wheel is geared to an indicating device 224 which indicates the generator connections established by rotation of the main generator and generator field switch operating shafts in different position of the hand wheel 223. The hand wheel 223 is mechanically connected with the port and starboard generator field selector shafts 231 and 232 through shaft 225, gears 226 and 227, shaft 228, gears 229, shaft 230, and gears 233 and 234 respectively, and with the main generator switch selector shafts 235 and 238 by gears 239 and 240 mounted on the shaft 230. Additional switch operating shafts 242 and 244, and selector shafts 241 and 243 are indicated in the drawing and may be utilized to control and operate a part of the main generator switches if desired.

Since the operation of all the main and field generator switch selector shafts is the same, it will be sufficient to describe the operation of the port field switch selector shaft 231. As illustrated, this shaft has three positions. In the position shown, all the links 219 are in engagement with the levers 217 and rotation of the switch operating shaft 201 will close all the contactors of the generator field switches 212 and 213. Upon rotation of the shaft 231 in a clockwise direction slots 245 in cams 248 will receive the members 246 which are pivoted at points 247 and connected with link 219 through links 249. The links 219 of the switch 213 will therefore be in a position to close this switch when the switch operating cam shaft 201 is moved from the position shown. The slots 250 in the cams 251, however, will be out of engagement with the corresponding members 246 and the links 219 of generator field switch 212 will be maintained in a position where they will not be affected by rotation of the shaft 201. Upon further movement of the selector shaft in a clockwise direction, the slots 245 will be moved out of engagement with the corresponding members 246 and the slots 250 will be moved into engagement with the corresponding members 246. Under these conditions, the generator field switch 212 is closed by rotation of the switch operating shaft 201 and the switch 213 is unaffected. The hand wheel 223 has a number of different operating positions which are dependent upon the number of different motor and generator combinations desired. As installed in an actual equipment, this hand wheel had seventeen different positions in each of which a different combination was produced as indicated by the indicator chart shown in Fig. 10.

A selector mechanism similar to that just described may be utilized to control the mechanical connection between the various reversing switches and the cam shaft of the reversing engines 62 and 64. As illustrated, however, the reversing switch of each motor is controlled by a separate selector mechanism. Thus the port reversing switches 23, 24, 25 and 26 are controlled by means of the levers or handles 255, 256, 257 and 258, the selector mechanisms operated by handles 256, 257 and 258 being omitted from the drawing for the sake of simplicity. The lever 255 is provided for the purpose of controlling the mechanical connection of the reversing switch 23 with its operating shaft 262 which is rotated by the piston rod 259 of the reversing engine 62 with which the operating shaft 262 is connected through rack 260 and pinion 261. In the illustrated position of the handle 255, the lever 263, pivoted at point 264, is mechanically connected to the link 265 between it and the movable contact 266 of the switch 23. Under these conditions, therefore, rotation of the cam 267 mounted on the shaft 262 will close the switch 23. Upon movement of the handle 255 to its downward position, however, the link 265 which is pivoted at the point 270′ is moved out of engagement with the lever 263 by means of link 268 and lever 269 mounted on the same shaft as the handle 255. Under these conditions the link 265 is out of engagement with the lever 263 and the switch 23 is unaffected by rotation of the operating shaft 262 of the reversing engine 62. Since the selector mechanism of all the port and starboard reversing switches is the same as that just described the arrangement will be clear without further description. For controlling the mechanical connection between the starboard reversing switches 27, 28, 29, and 30 and the switch operating shaft operated by reversing engine 64 levers 270, 271, 272, and 273 respectively are provided.

On the port side of the ship the reversing switch selector levers 255, 256, 257 and 258 are interlocked with the lever 78 of the fluid pressure operated interlock by which the reversing engine 62 is locked in mid position and by which concurrent operation of the generator engine 65 and the reversing engine 62 is rendered impossible. The structure and operation of this fluid pressure operated interlock has been previously described. In the up position of the lever 78, the levers 255, 256, 257 and 258 are locked either in the illustrated position due to the engagement of slots 275, 276, 277 and 278 with one end of the bell cranks 279, 280, 281 and 282 or in the down position by engagement of these bell cranks with slots 283, 284, 285 and 286 in the opposite sides of the cam shaped members which form the lower part of the handles. The bell cranks 279, 280, 281 and 282 are pivoted at the points 287, 288, 289 and 290 and at the left hand end are connected with rods 291 and 292 by the up and down movement of which they are rocked into and out of engagement with the slots on the reversing selector levers just described. Motion is transmitted to the rods 291 and 292 from the lever 78 which is pivoted at the point 293, through shaft 294, lever 295, link 296 and rocker arms 297 and 299 mounted on the rocker shaft 300. By this arrangement of interlocks the reversing switch selector levers are locked against movement at all times except when the reversing engine 62 is locked in a position to maintain all the port reversing switches in open position. For controlling the relation between the starboard reversing engine 64 and the reversing selector levers 270, 271, 272, 273 a like interlocking mechanism is provided, this mechanism being operated in response to movement of the lever 85 pivoted at the point 75.

The port reversing and pole changing controller 39 is operated by means of lever 301 pivoted at the point 302 and acting through link 303, lever 304, link 305 and lever 306. The starboard reversing and pole changing controller 40 and generator controller 41 are in like manner operated by means of levers 307 and 308 respectively. Through bar 309 and projections 310, 311 and 312 mounted thereon and arranged to engage slots 313, 314 and 315 respectively the levers 301 and 307 and 308 are interlocked to prevent movement of either of the levers 301 and 307 when the controller 41 is in any other than its "run" position and further to prevent movement of the lever 308 from the "run" position and movement of controller 41 when the levers 301 and 307 are in any other than "stop" position of controllers 39 and 40. These various positions of the controllers 39, 40 and 41 have been heretofore described in connection with Figs. 3 and 4. Both the generator and reversing engines and the controllers by which their operation is regulated are thus interlocked to insure the proper sequence of action when opening or closing the generator switches.

To preclude the opening of the port and starboard pole changing and reversing switches when the generator field switches 212, 213, 214, and 215 are closed and to prevent closure of the field switches when the reversing and pole changing switches are open, an interlocking mechanism is provided. On the starboard side of the ship this mechanism comprises slotted disc 316 mounted on shaft 322, bell crank 317 mounted on shaft 318, rod 319 rocker arm 320 mounted on the shaft 323, and cam 321 mounted on the same shaft 208 as the starboard field lever 206. As will be obvious on reference to the drawing the shaft 322 is mechanically connected with the starboard reversing and pole changing controller 40 through a link and lever. The disc 321 is provided with a slot, as indicated in the drawing, which engages a projection on the lever 320 when the starboard field lever 206 is in a position to open field switches 214 and 215 of the generators 1 and 2 respectively. Under these conditions the upper end of the bell crank 317 is out of engagement with any slot in the disc 316 and the lever 307 may be moved to vary the position of the reversing and pole changing controller 40. Upon movement of the lever 206 into a position required for closing switches 214 and 215, however, the lever 320 is forced upwardly by the cam 321 thereby causing the upper end of the bell crank 317 to engage a slot in the slotted disc 316 and lock the controller 40 against movement. Between the port field lever 200 and the port reversing and pole changing controller 39 an interlocking mechanism the same as that just described is interposed for the purpose of precluding opening of the port reversing and pole changing switches when the port field switches 212 and 213 for the generators 3 and 4 are closed.

Upon the same shaft 208 as the starboard field lever 206 is also mounted a cam 325 arranged to cooperate with a lever 326 pivoted at point 327 and mechanically connected through rod 328, bell crank 329 pivoted at the point 330, rod 332, lever 333, mounted on the shaft 334, and bell crank 335 also mounted on the shaft 334 with a rod 340 by movement of which the latches 336 and 337 are rocked about the points 338 and 339 respectively to lock the reversing engine 64 and pole changing engine 63 in either one of their operative positions. In the illustrated up or field open position of the starboard field lever 206, the latches 336 and 337 are disengaged from the operating shafts of the engines 64 and 63 and these engines may be operated as desired. With the engines 64 and 63 in either switch closing position the field lever 206 may be moved downwardly to a position for closing the field switches 214 and 215. Under these conditions the engines 64 and 63 are locked against movement by latches 336 and 337. It is therefore impossible to open the reversing or pole changing switches while the generator field switches are closed by reason of the fact that the field lever is mechanically interlocked both with the operating lever of the reversing and pole changing controller and with the operating shafts of the reversing and pole changing engines. By reason of the interlocks described it is also impossible to close the starboard generator field switches when either the reversing or the pole changing engine on the starboard side of the ship is not in one of its operative positions. The port field lever 200 in like manner is interlocked with the port reversing engine 62 and pole changing engine 63 and with the port reversing and pole changing controller lever 301.

Attached to the lower end of the bell crank 335 is a rod 341 arranged to cooperate with rod 342 connected to the lower end of bell crank 343 pivoted at 344 and with rod 345 mechanically connected to the latch 346 pivoted at the point 347 and arranged to engage the outer periphery of the disc 348 mounted on the generator selector shaft 230, the disk or cam 348 being so arranged as to force the lever 345 downwardly between the ends of rods 341 and 342 when the generator and generator field selector mechanism is in a position to permit connection of only starboard generators to the system. Under these conditions movement of rod 341 is transmitted to rod 342 and the starboard field lever 206 is therefore arranged to lock both the port and starboard reversing and pole changing engines against movement while any of the starboard generator field circuits are closed. In like manner both the port and starboard reversing and pole changing engines are locked in one of their operative positions by the port field lever 200 through a similar interlocking arrangement. Conversely the field levers cannot be moved to the closed position unless the reversing and pole changing engines are in one of their operative positions.

Aside from being mechanically interlocked with the field levers 200 and 206, the selector mechanism is further interlocked with the port and starboard generator switch engine operating shafts to prevent movement of the selector mechanism except when the generator engines 65 and 66 are in a position to open the generator switches 13 to 22 inclusive. On the port side of the ship this is accomplished through a member 351 pivoted at the point 352 and biased to its upper position by a spring 353. When the engine 65 is in a position to close the generator switches 13 to 17 inclusive the lower end of the member 351 is forced into a slot 354 on the gear 239 through which the generator selector mechanism is operated. This mechanism is therefore locked against movement when the generator switches are closed. When the engine 65 is in a position to open the generator switches, however, the upper end of the member 351 is forced by the spring 353 into a slot 356 on the gear 355 through which the generator switch operating shaft is rotated by the engine 65. Under these conditions, the selector is released in so far as the interlocking member 351 is concerned. The starboard generator switch operating shaft is likewise interlocked with the selector mechanism by a member 357.

Simultaneous operation of both generator engines is insured both by an interconnecting rod 358 and by reason of the fact that operating fluid is simultaneously supplied to these engines through the controller 41. Thus the generator selector mechanism is locked against movement when the generator switches are closed, and when the generator engines are in any position other than that required to open the generator switches.

As previously stated the controller 44 is operated in response to movement of the selector handwheel 223 and in either its "port" or "starboard" position permits control of the rotor switches by one of the controllers 42 and 43. Mounted upon the generator selector shaft 225 which is rotated by the handwheel 223 is a cam 360 operatively associated with a lever 361 pivoted at point 362 and at its upper end in engagement with a member 363 which forms one part of a clutch and is mounted on shaft 323 of the interlocking mechanism interconnecting the starboard field lever 206 with the reversing and pole changing lever 307. The other part 364 of this clutch is arranged to be rotated by the interlocking mechanism interposed between the port field lever 200 and the port reversing and pole changing lever 301. The clutch 363—364 and its associated operating apparatus is provided for locking together the two interlocking mechanisms just mentioned for the purpose of controlling the levers 301 and 307 in accordance with a single field lever. Thus when the controller 44 is in its port position the levers 301 and 307 are controlled in accordance with the position of the lever 200, when the controller 44 is in starboard position the levers 301 and 307 are controlled in accordance with the lever 206, and when the controller 44 is in its "port and starboard" position the levers 301 and 307 are controlled in accordance with field levers 200 and 206 respectively. In the "port" and "starboard" positions of the controller 44 the members 363 and 364 of the clutch are disengaged. In the "port and starboard" position of the controller 44 the members 363 and 364 are in engagement. It should be noted at this point that the rotor controller 42 is operated through lever 200, and that the controller 43 is operated by the lever 206 as hereinafter explained in connection with Fig. 11.

Means for manually operating the generator, reversing, and pole changing engines are provided. The hand wheels 365, 366 and 367 are provided for operating the engines 65, 62, and 61 respectively and handwheels 368, 369, and 370 are provided for operating the starboard engines 66, 64, and 63 respectively. Under normal operating conditions the foot pedals 371 and 372 pivoted at points 373 and 374 respectively are biased to the up position by springs or in any other suitable manner. Between the hand wheels and the engines operated by them are interposed clutch mechanism 375, 376, 377, 379, 380 and 381 inclusive which in the up positions of pedals 371 and 372 are inoperative. When the pedals 371 and 372 are moved to down position, however, the engines may be operated by their respective hand wheels. Between the manual control means just described and the operating levers 301, 308 and 307 is interposed an interlocking mechanism provided for the purpose of preventing simultaneous manual control and control by the switch engines. This interlocking mechanism comprises a shaft 385 which is operatively associated with the foot pedals 371 and 372 through cam latches 386 and 387 respectively and with the levers 301, 308 and 307 through lever 389, rod 390, lever 391, fixed to the sleeve 392 mounted to rotate about the shaft 318; projections 393 fixed to the sleeve 392, members 394, etc., as previously set forth. The projections 393 are forced against the members 394 by suitable means, shown as a spring 385'. When the levers 301 and 307 are thrown to stop position and the lever 308 to run position, the projections 393 engage the notches and the shaft 385 unlocks the cam latches 386 and 387, thereby freeing the pedals 371 and 372 so that they may be depressed to engage the clutches of the selector mechanism. When the pedals are thus depressed, the cam surfaces of the latches 386 and 387 are engaged by the rear ends of the pedal levers and the shaft 385 is locked against turning thereby preventing movement of the levers 301, 307 and 308 as long as either of the pedals remains depressed. When the pedals are released they move to their up positions disengaging the clutches and also freeing the shaft 385 so that the levers 301, 307 and 308 may be moved. Movement of the levers forces out the projections 393 against the action of the spring 385'. When the levers 301 and 307 are in any other than the "stop" position and the lever 308 in any other than the "run" position, the pedals 371 and 372 cannot be depressed for the reason that the rear ends of these pedals are caught by the latch portions of the cam latches 386 and 387. While Fig. 9 for the most part represents a practical construction, it has been necessary for the sake of clearness in the drawing to slightly modify certain features. Thus in a practical installation shaft 228, for example, would be a continuation of shaft 225. While a separate selector mechanism has been shown for controlling the connections of each motor, it is obvious that the motor connections may be controlled by a single selector mechanism or that a single selector mechanism may be provided for controlling the connections of the generators, the generator fields and the motors.

Fig. 11 illustrates one way in which the port rotor controller 42 may be operated in response to movement of the field lever 200 and starboard rotor controller 43 may be likewise operated by starboard field lever 206 for the purpose of changing the torque characteristics of the motors. Since the operation of each field lever is the same, it will be sufficient to describe that of lever 200. Referring to Fig. 11 it will be seen that the field lever 200 has six positions. In the "off" or up position of this lever the generator field switches and motor rotor switches are open. In the clockwise movement of this lever, the field contactors, 212 and 213, are closed in the "gen. field on" position and in the "superexcitation" position the resistor 401 in the field of the exciter 402 is short-circuited by a switch 403 biased to the open position by a spring 404. In this position of the lever, the connected generators on the port-side of the ship are overexcited and the secondary circuits of the port motors are connected for maximum torque. A lever 405 pivoted at the point 406 and interconnected with the port motor rotor controller 42 through a rod 407 is provided at its upper end with a hinged portion 408 biased to the right by a spring 409 which permits the lever 200 to slide past the end of lever 405 in its clockwise movement. In the counter clockwise movement of the lever 200, however, the lever 405 is moved to the position indicated by dotted lines and the controller 42 is thereby moved into its "close" position thereby admitting operating fluid to the rotor engines 49 to 52 and establishing the proper secondary connections for normal running. Simultaneously with the movement of the lever 405 into the position shown by dotted lines the rocker arm 410 which is interconnected with the lever 405 through link 411 is moved into a position, also indicated by dotted lines, in which its upper end will engage the lever 200 as it is moved toward the "off" position. In the "run" position of lever 200 the generator field circuits and the motor secondary circuits are arranged for normal operation. Movement of the lever 200 in a counter clockwise direction beyond the "gen. field on" position opens the field switches 212 and 213 and further movement to the "open rotor" position causes the lever to engage with the upper end of the member 410, thereby operating the controller 42 to its "open" position.

Assuming the controllers 39 and 40 to be in "stop" position, controller 41 to be in "open" position, field lever 200 and controller 42 to be in "off" and "open" positions respectively, and field lever 206 and controller 43 to likewise be in their respective "off" and "open" positions, the generator selector hand wheel 223 may be manipulated to set up any desired motor and generator combination. If it is desired to establish "set up No. 5", for example, the hand wheel 223 is rotated until the right hand end of the pointer 412 on the indicator 224 moves to a position over the numeral "5" in the "set up" column. The generator control lever 308 which operates the controller 41 may now be moved first to "close" position (see Fig. 12) thereby causing generator engines 65 and 66 to close generator switches 13, 15, 18, and 21, these being the switches for generators 1 and 3 which are selected by the selector mechanism at the position corresponding to this set up. Control lever 308 is then moved to "run" position thereby causing the port and starboard fluid pressure interlocks to unlock the reversing engines 62 and 64 and to lock the generator engines 65 and 66 in switch closed position. Movement of the fluid pressure interlock also causes the reversing switch selector levers to be locked in position. The generator selector mechanism was locked in place by the movement of the generator engines into "close" position, through interlocks 351 and 357 which engage slots in gears 239 and 240 respectively. Control lever 301 which operates the controller 39 may now be moved to the "ahead 2N-pole" position thereby connecting motors 5, 6, 7, and 8 to generator 1 through their corresponding reversing and pole changing switches and control lever 307 which operates controller 40 may be operated in like manner to connect motors 9, 10, 11 and 12 to generator 3. The fields of generators 1 and 3 may now be excited by operation of field levers 200 and 206 respectively as previously explained. Operation of these levers also actuates the rotor switches to establish the desired motor secondary connections at each stage of the operation. Any other motor and generator set up shown on the indicator 224 may be established in like manner.

Should it be desired to leave any particular motor disconnected, this may be done by moving the selector lever of such motor to the down position, thereby rendering the corresponding reversing switch unresponsive to movement of the engine by which it is operated. This operation of the motor selector levers can be effected only while the entire selector mechanism is unlocked, or, in other words, only under the conditions which permit of manipulating the selector hand wheel 223.

While the operation of the system has been heretofore set forth in detail, it will be helpful to outline briefly certain controlling and maneuvering operations, reference being had to Fig. 12 which illustrates the various positions of control levers 200, 206, 301, 307 and 308. Let us assume that the ship is running at full speed ahead with all of the generators and motors in operation. The field levers 200 and 206 will be in their normal "field on" position, the control lever 308 will be in the "run" position and the control levers 301 and 307 in their "ahead N-pole" position. If the order comes for full speed astern the operator will first move the field levers 200 and 206 to the "off" position and then move the levers 301 and 307 to the "back 2N-pole" or astern position. He will then move the field levers 200 and 206 to their "superexcitation" position. While the field levers are in the superexcitation position, the motor rotor switches are still open which gives high torque during the condition in which the slip is high. As heretofore indicated, this may be done by inserting resistors in the rotor circuits, but preferably the motors will be provided with a high resistance squirrel cage winding and a low resistance definite winding and the rotor switches will keep open the circuit of the definite winding until the field lever is moved to reduce the excitation to normal. The motors will, therefore, develop high torque to reverse the ship. The reversing operation may be facilitated by reducing the speed of the turbines driving the main generators in a manner well known in the art. When the motors have developed sufficient speed in the astern direction, the field control levers 200 and 206 will be moved to their normal "field on" position and this movement will change the motor rotor connections to give high torque with low slip. If the rotor switches control resistors, the resistors will now be short-circuited. If the rotor switches control the circuits of definite windings on the motors, the circuits of these windings will now be closed and the ship will proceed in the astern direction at a speed dependent upon the speed of the turbines driving the generators. If the order now comes for full speed ahead, the operator will move the field levers to the off position, move the control levers 301 and 307 to the ahead 2N-pole position, and then operate the field levers to apply superexcitation until sufficient speed has been attained in the forward direction to enable the motors to pull into step on the N-pole connection at which time he will again move the field levers to the off position, throw the control levers 301 and 307 to the ahead N-pole position, and then move the field levers to apply superexcitation, and then normal excitation, as heretofore set forth. If, while operating in the full speed ahead position, the order comes to let the ship drift, the field levers will be moved to the off position and the control levers 301 and 307 to the stop position. To stop the ship quickly at any time, the propellers may be reversed as in any steamship.

It will be observed that all of the maneuvering operations above set forth are accomplished merely by the two field levers and the two control levers 301 and 307, the control lever 308 remaining untouched in its "run" position. The lever 308 needs to be operated only when it is desired to change the generator set-up. If it is desired to change this set-up, the field levers are thrown to "off" position and the control levers 301 and 307 to the "stop" position. The lever 308 is then thrown to the "open" position and the selector mechanism may then be operated to make the desired set-up, after which the lever 308 is thrown to the "close" position and then to the run position. Further maneuvering of the ship with the new set-up is then made by the operation of the field levers and the control levers 301 and 307 as above set forth.

If one or more generators on the starboard side of the ship only are selected, the field lever 206 alone needs to be moved, the lever 200 being left in the "off" position. If one or more generators on the port side of the ship only are selected, the field lever 200 alone will be used, the lever 206 being left in the "off" position.

As heretofore set forth the particular switches to be operated can be selected only while the various switches of the system are in a predetermined position making the selecting operation safe. It will also be seen that after the desired selection of generators and motors has been made, the entire control of the ship is effected by the manipulation of two control levers 301 and 307 and two field levers 200 and 206, and that these levers are so interlocked as to make it impossible to manipulate them in an improper sequence or in any way to cause trouble. While the control system is adapted to control the operation of a ship of any size it has been particularly designed for the control of battle cruisers and aeroplane carriers. These ships must be capable of operation at high speed and installations are being built requiring approximately 180,000 horse power at full speed. It will be seen that in case of damage to any part of the automatic control apparatus, the operation of the various switches may be effected manually and that the interlocks are still effective to prevent a harmful sequence of operation or an operation of any character that might cause damage.

While we have illustrated and described a preferred embodiment of our invention, we desire to have it understood that our invention in its broader aspects is not limited to the specific devices described since many variations and modifications will be obvious to those skilled in the art and we, therefore, aim in the appended claims to cover all such variations and modifications as are within the true spirit and scope of our invention.

What we claim as new and desire to secure by Letters Patent of the United States is:

1. An electric power control system wherein a plurality of generators are arranged for supplying current to a plurality of motors through circuit connections controlled by switches and wherein means are provided for operating said switches, characterized by the fact that means are provided for selectively establishing and disestablishing mechanical connections between said switches and said operating means whereby said generators may be connected with said motors to produce different generator and motor combinations with the same operation of said operating means.

2. An electric power control system wherein a plurality of generators are arranged for supplying current to a plurality of motors through circuit connections controlled by generator switches and wherein means are provided for operating said switches, characterized by the fact that a selector mechanism is provided for selectively establishing or disestablishing a mechanical connection between each of said switches and said operating means whereby said generators may be connected with said motors to produce different generator and motor combinations upon operation of said operating means.

3. A system of ship propulsion wherein a plurality of generators are arranged for supplying current to a plurality of propeller motors through circuit connections controlled by generator and reversing switches, comprising means for operating said generator switches, a generator selector mechanism for rendering each of said generator switches unresponsive to its operating means, means for operating said reversing switches, and selector means for rendering each reversing switch unresponsive to its operating means.

4. An electric power control system wherein a plurality of motors are arranged to be supplied with power from a plurality of generators through circuit connections provided with generator and reversing switches, comprising means for operating said generator and reversing switches, switch selector means for rendering any switch unresponsive to its operating means, means for operating said switches, and interlocking means for preventing manipulation of said selector means when any of said reversing switches are in closed position.

5. A power control system wherein a plurality of motors are supplied with power from generating means through circuit connections controlled by a plurality of switches, comprising a fluid pressure engine for operating said switches, and selector means for selectively controlling the relation between said switches and said engine.

6. A system of ship propulsion wherein the propeller motors are supplied with current from generators through a plurality of generator switches, and wherein a generator field switch is provided for controlling the field connections of each generator, comprising means for operating said generator and generator field switches, and a selector mechanism for rendering any of said switches unresponsive to their operating means, whereby various motor and generator combinations may be produced.

7. A system of ship propulsion wherein the propeller motors are supplied with power from generators through a plurality of generator switches, and wherein a generator field switch is provided for controlling the field connection of each generator, comprising fluid pressure operated means for operating said generator switches, manually operated means for operating said field switches, and a selector mechanism for rendering any of said switches unresponsive to their operating means, whereby various motor and generator combinations may be produced.

8. A system of ship propulsion wherein the propeller motors are supplied with power from generators through circuit connections controlled by a plurality of generator switches, comprising means for operating said switches, a selector mechanism for rendering any of said switches unresponsive to said means, and interlocking means for preventing movement of said selector mechanism when said switches are in closed position.

9. A system of ship propulsion wherein the propeller motors are supplied with power from generators through circuit connections controlled by a plurality of generator and reversing switches, comprising fluid pressure controlled means for operating said generator switches, fluid pressure controlled means for operating said reversing switches, and fluid pressure controlled interlocking means arranged to lock said generator switches in closed position when any of said reversing switches are closed and to lock said reversing switches in open position when said generator switches are open.

10. A system of ship propulsion wherein the propeller motors are supplied with power from generators through circuit connections controlled by a plurality of generator and reversing switches, comprising fluid pressure controlled means for operating said generator switches, fluid pressure controlled means for operating said reversing switches, fluid pressure controlled interlocking means arranged to lock said generator switch operating means in a position to close said generator switches when any of said reversing switches are closed and to lock said reversing switch operating means in a position to open said reversing switches when said generator switches are open, and means for retarding the movement of said reversing switch operating means when it is in a position to open said reversing switches.

11. A system of ship propulsion wherein the propeller motors are supplied with current from a plurality of generators through generator and reversing switches and wherein a field switch is provided for controlling the field connections of each generator, comprising means for operating said generator, reversing and generator field switches, a selector mechanism for rendering any of said generator and generator field switches unresponsive to their respective operating means, interlocking means arranged to prevent the operation of said selector mechanism when any of said generator switches are closed, selector means for rendering any of said reversing switches unresponsive to their operating means, fluid pressure operated interlocking means arranged to lock said generator switches in closed position and to lock said reversing switch selector means against manipulation when any of said reversing switches are in closed position and to lock said reversing switches in open position and permit manipulation of said reversing switch selector mechanism when said generator switches are open, and a timer for retarding the movement of said reversing switch operating means when it is in a position to open said reversing switches.

12. A system of ship propulsion wherein the propeller motors are arranged to be supplied with current from a plurality of generators through circuit connections controlled by generator and reversing switches and wherein a field switch is provided for controlling the field connections of each generator, comprising manually controlled means for operating said field switches, fluid pressure controlled means for operating said generator switches, a generator switch selector mechanism for rendering any generator and field switch unresponsive to its control means, interlocking means arranged to lock said selector mechanism when any of said generator switches are closed, fluid pressure controlled means for operating said reversing switches, reversing switch selector means for rendering any of said reversing switches unresponsive to their control means, fluid pressure operated interlocking means for locking said selector mechanisms when any of said reversing switches are in closed position, and a fluid operated timer arranged to retard the movement of said reversing switch operating means in a position to open said reversing switches and to act as a dash-pot when said reversing switches are moved to either operating position.

13. A system of ship propulsion wherein the propeller motors are arranged to be supplied with current from a plurality of generators through connections controlled by reversing and pole changing switches and wherein a field switch is provided for controlling the field connections of each generator, comprising fluid pressure means for operating said reversing and pole changing switches, manual means for operating said field switches, interlocking means for locking said fluid pressure means in closed position when said manual means is in a position to close said field switches, means for controlling the energization of said fluid pressure control means, and interlocking means for locking said control means against movement when said manual means is in a position to close said field switches.

14. A power control system wherein a plurality of propeller motors are supplied with current from a generator provided with a field switch, comprising means for controlling the operation of said field switch, rotor switches for changing the secondary connections of said motors, fluid pressure operated means for operating said rotor switches, a pilot valve for controlling the operation of said fluid pressure means, and a controller operated in response to movement of said field control means for controlling the energization of said pilot valve.

15. A system of ship propulsion wherein a plurality of groups of propeller motors are arranged to be supplied with current from a plurality of groups of generators through circuit connections controlled by generator switches and wherein field switches are provided for controlling the field connections of said generators, comprising means for operating said generator switches, separate means for operating the field switches of each group of generators, rotor switches operated in response to movement of the field switch operating means of the group in which they are located, a selector mechanism for rendering any of said generator and field switches unresponsive to their respective operating means, and a controller operated in response to manipulation of said selector mechanism for rendering the rotor switches of all groups responsive to a single field switch control means when operating generators in a single group.

16. A system of ship propulsion wherein a plurality of groups of propeller motors are arranged to be supplied with power from a plurality of groups of generators through circuit connections provided with generator, reversing and pole changing switches, comprising means for operating said generator, reversing and pole changing switches, field switches for controlling the field connections of said generators, separate means for operating the field switches of each group of generators, rotor switches operated in response to movement of the field switch operating means of the group in which they are located, a selector mechanism for rendering any of said generator and field switches unresponsive to their operating means, a controller valve operated in response to manipulation of said selector mechanism for rendering the rotor switches of all the groups responsive to movement of a single field lever when operating the generators in a single group, and interlocking means responsive to movement of a single field switch operating means for locking all said reversing and pole changing operating means in a position to close said reversing and pole changing switches when operating generators in a single group.

17. A system of ship propulsion wherein the propeller motors are supplied with current from a plurality of generators through circuit connections controlled by generator and reversing switches, comprising a fluid pressure engine for operating said generator switches, a controller valve for controlling the operation of said generator switch engine, a fluid pressure engine for operating said reversing switches, a controller valve for controlling the operation of said reversing switch engine, and interlocking means controlled by said generator controller valve for locking said reversing switch engine in a position to open said reversing switches.

18. A system of ship propulsion wherein the propeller motors are supplied with current from a plurality of generators through circuit connections controlled by generator and reversing switches, comprising a fluid pressure engine for operating said generator switches, a controller for controlling the operation of said generator switch engine, interlocking means controlled by said generator controller for locking said reversing switch engine in a position to open said reversing switches, and a valve controlled by said interlocking means for admitting operating fluid to said generator switch engine only when said reversing switches are in open position.

19. A system of ship propulsion wherein the propeller motors are supplied with current from a plurality of generators through circuit connections controlled by generator and reversing switches, comprising a fluid pressure engine for operating said generator switches, a controller for controlling the operation of said generator switch engine, interlocking means controlled by said generator controller for locking said reversing switch engine in a position to open said reversing switches, a valve controlled by said interlocking means for admitting operating fluid to said generator switch engine only when said reversing switches are in open position, and a valve operated by movement of said reversing switch engine for admitting operating fluid from said generator controller to said reversing switch engine for operating the same.

20. A system of ship propulsion wherein the propeller motors are supplied with current from a plurality of generators through connections controlled by generator and reversing switches, comprising a fluid pressure engine for operating said generator switches, a controller for controlling the operation of said generator switch engine, interlocking means controlled by said generator controller for locking said reversing switch engine in a position to open said reversing switches, a valve controlled by said interlocking means for admitting operating fluid to said generator switch engine only when said reversing switches are in open position, a valve operated by movement of said reversing switch engine for admitting operating fluid from said generator controller valve to said reversing switch engine for operating the same, and a timer mounted on the operating rod of said reversing engine for cushioning said engine at the end of its stroke and for slowing up the movement of said engine in mid position to permit operation of said interlocking means.

21. An electric switch operating means wherein a fluid pressure engine is arranged to be operated from two sources of compressed fluid characterized by the fact that means responsive to one source of compressed fluid are provided for stopping said engine in mid position when it is operated from said source and means responsive to the other of said sources are provided for stopping said engine at either end of its travel.

22. An electric switch, and means for operating said switch comprising a fluid pressure engine arranged to close said switch at either end of its stroke and to open said switch near the center of its stroke, said engine being arranged to be operated from two sources of compressed fluid, and means responsive to one source of compressed fluid for stopping said engine in mid position when it is operated from said source whereby said engine may be operated from one source to close said switch in either operating position and from the other source to move said switch to open position.

23. An electric switch having two operative positions, a fluid pressure engine for operating said switch, a source of fluid pressure for moving said engine to either operative position, a second source of fluid pressure for moving said engine from either operative position to mid position, and means operated by said second source of fluid pressure for stopping and locking said engine in mid position.

24. An electric switch having two operative positions, a fluid pressure engine for operating said switch, a source of fluid pressure for moving said engine to either operative position, a second source of fluid pressure for moving said engine from either operative position to mid position, means operated by said second source of fluid pressure for stopping and locking said engine in mid position, and a fluid operated timer for cushioning said engine at the end of each stroke and for retarding the movement of said engine in mid-position.

25. A double throw switch, a fluid pressure engine for operating said double throw switch, a source of fluid pressure for moving said engine to either operative position, a second source of fluid pressure for operating said engine, a single throw switch, a fluid pressure engine operable from said second source of fluid pressure for operating said single throw switch, and interlock means for locking said single throw switch in closed position, when said double throw switch is in either operative position, said means being responsive to said second source of fluid pressure to release said single throw switch and to stop and lock said double throw switch in open position when said double throw switch is operated from said second source of fluid pressure.

26. A double throw switch, a fluid pressure engine for operating said double throw switch, a source of fluid pressure for moving said engine to either operative position, a second source of fluid pressure for operating said engine, a single throw switch, a fluid pressure engine operable from said second source of fluid pressure for operating said single throw switch, interlock means for locking said single throw switch in closed position when said double throw switch is in either operative position, said means being responsive to said second source of fluid pressure to release said single throw switch and to stop and lock said double throw switch in open position when said double throw switch is operated from said second source of fluid pressure, and a valve operated by said interlock means for admitting operating fluid to said single throw switch engine only when said double throw switch is in open position.

27. A double throw switch, a fluid pressure engine for operating said double throw switch, a source of fluid pressure for moving said engine to either operative position, a second source of fluid pressure for operating said engine, a single throw switch, a fluid pressure engine operable from said second source of fluid pressure for operating said single throw switch, interlock means for locking said single throw switch in closed position when said double throw switch is in either operative position, said means being responsive to said second source of fluid pressure to release said single throw switch and to stop and lock said double throw switch in open position when said double throw switch is operated from said second source of fluid pressure, a valve operated by said interlock means to admit operating fluid to said single throw switch engine only when said double throw switch is in open position, and a valve operated by the movement of said double throw switch engine for controlling the supply of operating fluid from said second source of fluid pressure to said double throw switch engine.

28. A double throw switch, a fluid pressure engine for operating said double throw switch, a source of fluid pressure for moving said engine to either operative position, a second source of fluid pressure for operating said engine, a single throw switch, a fluid pressure engine operable from said second source of fluid pressure for operating said single throw switch, interlock means for locking said single throw switch in closed position when said double throw switch is in either operative position, said means being responsive to said second source of fluid pressure to release said single throw switch and to stop and lock said double throw switch in open position when said double throw switch is operated from said second source of fluid pressure, a valve operated by said interlock means to admit operating fluid to said single throw switch engine only when said double throw switch is in open position, a valve operated by the movement of said double throw switch engine for controlling the supply of operating fluid from said second source of fluid pressure to said double throw switch engine, and a timer associated with the operating rod of said double throw switch engine for cushioning it at the end of each stroke and for slowing up its movement in mid-position.

29. A fluid pressure control system comprising two fluid pressure engines each adapted to operate in one direction or the other in accordance with the direction in which operating fluid is admitted to said engines; a controller arranged when in one position to admit operating fluid to operate both of said engines in predetermined directions and when in another position to admit operating fluid to operate said engines in the opposite directions, a second controller for controlling the operation of only one of said engines and arranged when in one of two positions to admit fluid pressure to operate the engine controlled thereby, and means operated by the engine controlled by said second controller for controlling the direction of fluid admission to said engine so that said engine is operated in the opposite direction from whatever direction it may have been last moved by operating fluid admitted through said first controller.

30. A fluid pressure control system comprising two fluid pressure engines each adapted to operate in one direction or the other in accordance with the direction in which operating fluid is admitted to said engines, a controller arranged when in one position to admit operating fluid to operate both of said engines in predetermined directions and when in another position to admit operating fluid to operate said engines in the opposite directions, a second controller for controlling the operation of only one of said engines and arranged when in one of two positions to admit fluid pressure to operate the engine controlled thereby, and means operated in response to energization of said engine through said second controller for stopping said engine in mid-position.

31. A fluid pressure control system comprising two fluid pressure engines each adapted to operate in one direction or the other in accordance with the direction in which operating fluid is admitted to said engines, a controller arranged when in one position to admit operating fluid to operate both of said engines in predetermined directions and when in another position to admit operating fluid to operate said engines in the opposite directions, a second controller for controlling the operation of only one of said engines and arranged when in one of two positions to admit fluid pressure to operate the engine controlled thereby, a timer for cushioning said engine at the end of its stroke and for retarding the movement of said engine near the center of its stroke, and means operated in response to energization of said engine through said second controller for stopping said engine in mid-position.

32. A fluid pressure control system comprising reversing switch, pole changing switch and generator switch fluid pressure engines each adapted to operate in one direction or the other in accordance with the direction in which operating fluid is admitted to said engines, a controller arranged when in one position to admit operating fluid to operate said reversing and pole changing switch engines in predetermined directions and when in another position to admit operating fluid to operate said reversing and pole changing engines in the opposite direction, a second controller for controlling the operation of said reversing and generator switch engines and arranged when in one position to admit operating fluid to operate said reversing and pole changing engines and when in another position to admit fluid to operate said generator engine, and means operated by said reversing switch engine for controlling the direction of fluid admission to it from said second controller so that it is operated in the opposite direction from whatever direction it may have last been moved by operating fluid admitted through said first controller.

33. A fluid pressure control system comprising reversing switch, pole changing switch and generator switch fluid pressure engines each adapted to operate in one direction or the other in accordance with the direction in which operating fluid is admitted to said engines, a controller arranged when in one position to admit operating fluid to operate said reversing and pole changing switch engines in predetermined directions and when in another position to admit operating fluid to operate said reversing and pole changing switch engines in the opposite direction, a second controller for controlling the operation of said reversing and generator switch engines and arranged when in one position to admit operating fluid to operate said reversing and generator switch engines and when in another position to admit fluid to operate said generator switch engine, and means operated in response to energization of said reversing switch engine through said second controller for stopping it in mid-position.

34. A fluid pressure control system comprising reversing switch, pole changing switch and generator switch fluid pressure engines each adapted to operate in one direction or the other in accordance with the direction in which operating fluid is admitted to said engines, a controller arranged when in one position to admit operating fluid to operate said reversing switch and pole changing switch engines in predetermined directions and when in another position to admit operating fluid to operate said reversing and pole changing switch engines in the opposite direction, a second controller for controlling the operation of said reversing and generator switch engines and arranged when in one position to admit operating fluid to operate said reversing and pole changing switch engines and when in another position to admit fluid to operate said generator switch engine, and a timer for cushioning said reversing switch engine at the end of its stroke and for retarding its movement near the center of its stroke, and means operated in response to energization of said reversing switch engine through said second controller for stopping it in mid-position.

35. A control system comprising a fluid pressure engine having a movable element, a source of fluid pressure supply and a fluid pressure connection from said source arranged to apply fluid pressure to move said element in one direction, a second fluid pressure connection from said source arranged to apply fluid pressure to move said element in the opposite direction, a second source of fluid pressure and a single fluid pressure connection therefrom leading to said fluid pressure engine, a selector valve in each of the fluid pressure connections from said first mentioned source of fluid pressure, and a valve operated by said fluid pressure engine and cooperating with said selector valve whereby whenever pressure is applied from said second source said engine operates in the opposite direction from whatever direction it may have been last moved by said first mentioned source.

36. In a control system of the class described, two groups of fluid pressure engines; a pair of fluid pressure control valves and a third control valve cooperating with said pair of valves to control operation of said fluid pressure engines, characterized by the fact that said third control valve when in one position connects said pair of control valves to said groups of engines so that each valve of said pair individually controls one of said groups of engines and by the further fact that said third control valve may be moved to two other positions in which one or the other of said pair of valves respectively may be used to control all of the engines of both groups.

37. A system of ship propulsion wherein a plurality of propeller motors are arranged to be supplied with current from one or both of two generators and wherein means are provided for changing the torque characteristics of said motors, characterized by the fact that independently operable means are provided for respectively controlling the excitation of said generators and by the further fact that means are provided whereby each of said excitation controlling means respectively controls groups of said torque characteristic changing means when both of said generators are operating and either controls all of said torque characteristic changing means when only the generator corresponding to it is operating.

38. An electric power system wherein a plurality of sources of current are arranged to be connected in various combinations to a plurality of translating devices through circuit connections controlled by switches and wherein means are provided for actuating each switch, characterized by the fact that means adapted to operate said actuating means simultaneously are provided and by the further fact that means adapted to control the actuation of said switches by said operating means are arranged to determine which of said switches shall be actuated in response to the operation of said operating means.

In witness whereof, we have hereunto set our hands this 17th day of October, 1923.

CLARENCE T. CROCKER.
RAY STEARNS.
LEWIS W. WEBB.